INVENTOR.
ROBERT E. VARNEY
BY Robert S. Dunham
ATTORNEY

July 3, 1962 R. E. VARNEY 3,042,186
CONVEYING APPARATUS FOR INDIVIDUAL OBJECTS
Filed April 29, 1960 6 Sheets-Sheet 4

INVENTOR.
ROBERT E. VARNEY
BY Robert S. Dunham
ATTORNEY

July 3, 1962   R. E. VARNEY   3,042,186
CONVEYING APPARATUS FOR INDIVIDUAL OBJECTS
Filed April 29, 1960   6 Sheets-Sheet 6

INVENTOR.
ROBERT E. VARNEY
BY Robert S. Dunham
ATTORNEY

United States Patent Office 3,042,186
Patented July 3, 1962

3,042,186
CONVEYING APPARATUS FOR INDIVIDUAL OBJECTS
Robert Everett Varney, Orlando, Fla., assignor, by mesne assignments, to American Machinery Corporation, Orlando, Fla., a corporation of Florida
Filed Apr. 29, 1960, Ser. No. 25,655
26 Claims. (Cl. 198—185)

This invention relates to conveying apparatus and more especially to conveying apparatus of the type for conveying or transporting separate or discrete objects along a given path. The invention more particularly relates to apparatus for conveying or transporting a plurality of separate objects supported in the conveying apparatus and arranged in succession along and for travel in a given path, and to means for disengaging the objects from the supporting means.

In the handling of separate or discrete objects of various kinds it is often necessary to carry out repetitively the same operation on a plurality of objects in succession. In preparing separate or discrete objects for subsequent treatment or for storage or use, it is often further necessary to carry out a plurality of different operations in a predetermined succession, each of these operations being carried out repetitively on the respective objects in succession. In the preparation of food for market such repetitive operations and a plurality of such different operations in succession frequently are utilized. Especially in the processing of perishable food, such as meat, poultry and the like, it is necessary or desirable that there shall be a minimum of handling by the operators and that the means for support of the separate objects shall provide for cleanliness, a minimum of contact by the hands of the operators and the travel of the processed objects to locations, such as a subsequent treatment zone or a packing station, to which the objects may be delivered for such treatment, or for packing the objects in containers or wrappers for protection against contamination during transportation to market and in the selling establishments, or for other processing.

The invention relates to the problem of processing such separate or discrete objects and to apparatus therefor and will be described more particularly, in connection with a conveyor system, with respect to processing poultry units, chickens, ducks, turkeys and the like which require plucking, or removal of the viscera, removal of the pin feathers and hairs, and other operations preparatory to packing for market. It will be understood, however, that the apparatus of the invention may be adapted for use in connection with systems conveying other types of separate or discrete objects.

Conveying apparatus has been utilized heretofore in connection with such processing of poultry or the like and devices have been constructed which are suitable for supporting the poultry units on the conveyor in different stages of the processing for the different operations to be carried out thereon, as well as for transporting the poultry units from one operation to another. Among these devices are shackles of particular form which are supported by the conveyor, for example, an overhead cable type conveyor the cable of which travels horizontally, the shackles being supported in depending relation to this overhead cable and traveling along a horizontal path concomitantly with travel of the conveyor cable.

A shackle of this type has been constructed heretofore in which two V-shaped notches are provided each defined by portions of the shackle or its frame at either side of the notch, these portions being connected suitably to the means for suspending the shackle from the conveyor. Preferably these shackles are formed from a rod bent to provide the two portions at the sides of the respective notches, the two notches being spaced in relation to each other in a common plane determined by the two portions of the rod which define each notch. These notches are open upwardly so that, for example, the legs of a chicken or other unit respectively may be inserted in the notches, the lower ends of the notches being restricted in width with respect to the open end of the notch so that the two legs of the chicken will be engaged between the portions of the rod at either side of the notch at the lower end thereof, the bone enlargements of the joints preventing pulling the legs out of the notches. Thus, the chicken may hang with its head or neck downward when the shackle is supported at a point above the upper open ends of the notches. When the point of attachment of the suspending means is upwardly of the notches and disposed symmetrically therebetween, the shackle hangs generally vertically. When the legs of the chicken are disposed in the notches the chicken hangs below the shackle and generally vertically below the point of support of the shackle on the conveyor.

If desired the shackle may be provided with a third notch open upwardly and restricted at its lower end for receiving the neck portion of the chicken if this is the more convenient disposition for some operations. This third notch may be disposed between the two notches above mentioned and may be provided by a part of the rod bent to form and secured as by welding or the like to the respective adjacent side portions of the rod which are disposed in the common plane of and form the two notches as above mentioned. Alternatively the wings of the chicken may be engaged with the two notches first mentioned for suspending the chicken.

It will be understood that a conventional shackle of this type may conveniently carry poultry units of different kinds, either with the head downward for certain operations or with the legs downward for other operations. By providing a plurality of such shackles supported in spaced relation by and along the conveyor cable or other transporting element of the conveyor, a plurality of the poultry units, chickens or the like, may be transported through zones or locations in which different operations on the poultry units are carried out. In order that the operator may work on the poultry unit conveniently in any given operation, the means for suspending the shackle provides for swivelling or rotational movement on a vertically extending line to turn different sides of the unit toward the operator.

When a selected operation or a series of such operations is completed and it is desired to remove the poultry units from the conveyor for a subsequent treatment, storage, packing or other purpose not requiring the conveyor, it is desirable not only to avoid handling by the hands of the operator but also to effect the removal from the conveyor at a speed conforming to the rate of travel of the conveyor. The number of units of poultry delivered per unit of time by the conveyor to a location where it is desired to remove the units from the conveyor may be that at which the separate units of poultry are subjected to a final operation preparatory to removal from the conveyor. In conventional processes where manual removal is practiced, it is not always possible to develop a rate of removal high enough to equal that at which the units are transported by the conveyor from the final operation. This retardation may occur because of the necessity for manually holding the shackle against upward movement when the legs of the poultry or the neck thereof are lifted manually by lifting the body of the bird or by lifting the legs or the neck thereof.

It is an object of the invention to provide apparatus for effecting removal of an object from a supporting means supported by a conveyor for travel along a given path, the object having been brought into engagement with the supporting means with a predetermined movement of the object.

It is another object of the invention to provide apparatus for lifting an object from a supporting means supported by a conveyor for horizontal movement along a given path.

It is a further object of the invention to provide apparatus for removing an object carried by a shackle supported by a conveyor for movement along a given path, this shackle having a form requiring for releasing the object that the object be moved in a direction opposite to the direction in which the object was moved into holding engagement with the shackle.

It is a still further object of the invention to provide apparatus for removing a poultry unit from a shackle supported by a horizontally moving conveyor, the shackle being formed to require lifting movement of the poultry unit or a part thereof with respect to the shackle in order to disengage the poultry unit from the shackle.

It is an additional important object of the invention to provide apparatus for automatically effecting disengagement in succession of a plurality of poultry units from respective shackles supported by a horizontally moving conveyor and arranged in succession along the conveyor, these shackles being suspended from the conveyor.

It is a feature of the invention that means are provided which cooperate with conventional elements of a conveyor system constructed for handling separate objects, and more particularly separate poultry units, to control the object supporting device or shackle supported by the conveyor as the shackle travels along a predetermined path which extends along the path of travel of the conveyor. This control of the shackle is accomplished taking into account the requirements of the conventional apparatus for processing the poultry units. These requirements, as above mentioned, include the support of the poultry unit in suspended relation to the conveying apparatus and preferably in depending relation to a shackle but also so that the poultry unit may be turned about a vertical line of suspension for access to all sides of the unit. The swivelling movement of the shackles, therefore, may be effected at locations where operations are carried out which require such turning of the poultry unit. During travel of the shackles carrying the poultry units supported by the conveyor toward a given operation location, conventional means are provided which prevent any substantial swivelling movement. For the purposes of the invention, in order that the shackles separately may be controlled for effecting disengagement of the poultry units therefrom, the shackles are conveyed beyond the conventional swivelling preventing means referred to and, therefore, unless otherwise controlled, are subject to swivelling movement while still carrying the poultry units. As will be understood from description to follow, aligning means are provided to control the position of the shackle and its orientation relative to the path of travel as the units travel to the disengaging means.

A further feature of the control secured in the apparatus of the invention provides for gripping the shackle to prevent movement of the shackle transversely of the path of travel thereof effected by the conveyor. Where this travel of the conveyor is horizontal, usually the gripping means prevents upward movement of the shackle so that the poultry unit may be lifted from the shackle by lifting the legs from the two notches above mentioned or lifting the neck from the centrally disposed notch.

Means also is provided which cooperates with this gripping or restraining means so as to effect the lifting of the poultry unit, more specifically the legs or the neck thereof, from the respective notches, thereby to disengage the poultry unit from the shackle.

The control means for alignment and orientation above mentioned is disposed in relation to the conventional swivelling preventing means so as to engage each shackle after it has traveled out of engagement with this conventional swivelling preventing means and preferably so as to orient its position with the common plane of the notches of the shackle generally parallel to the path of travel of the poultry unit, thereby properly to deliver the shackle into gripping relation to the gripping or restraining means. This alignment ments also determines the disposition of the shackle and therefore of the poultry unit so that, when the shackle is gripped and restrained from transverse movement, the poultry unit may be disposed properly so as to be engaged by the disengaging or lifting means above mentioned, the units being engaged in succession without interfering with the continuous travel of the shackle in succession along the path of travel thereof generally parallel to the conveyor.

As will be more clearly understood from the description to follow taken in connection with the drawings, the arrangement of the parts of the apparatus of the invention which take over the control of the shackle released from the conventional aligning means as the shackle travels into engagement with the gripping and restraining means and as the poultry unit travels into engagement with the disengaging means is such that the poultry unit may be entirely freed from engagement with the shackle while the shackle continuously is moved by the conveyor out of the zone of disengagement for normal return to a location where the initial operation of the process is carried out.

Other objects and features of the invention will be understood from a description of the drawings to follow in which.

Figure 1:
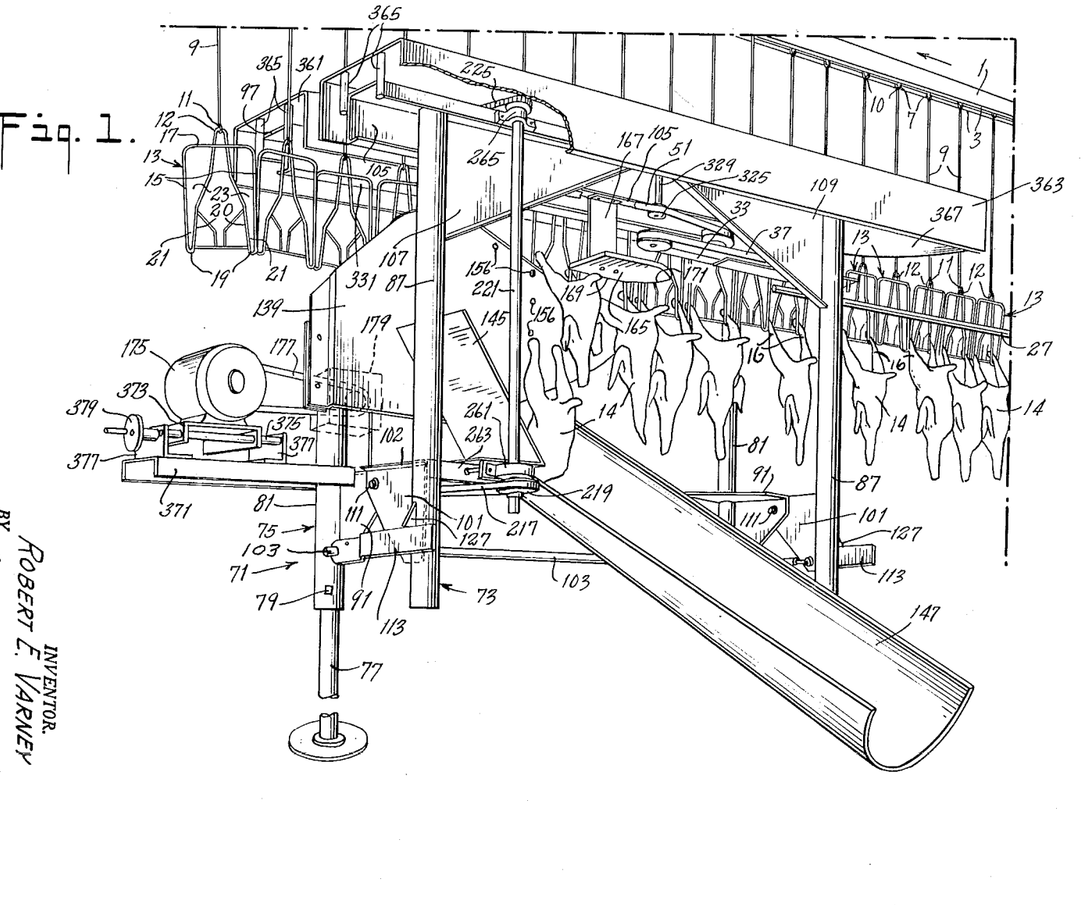
FIG. 1 shows in perspective the apparatus of the invention for disengaging poultry units from the shackles of a poultry conveyor system.
Figures 11, 12, 13:
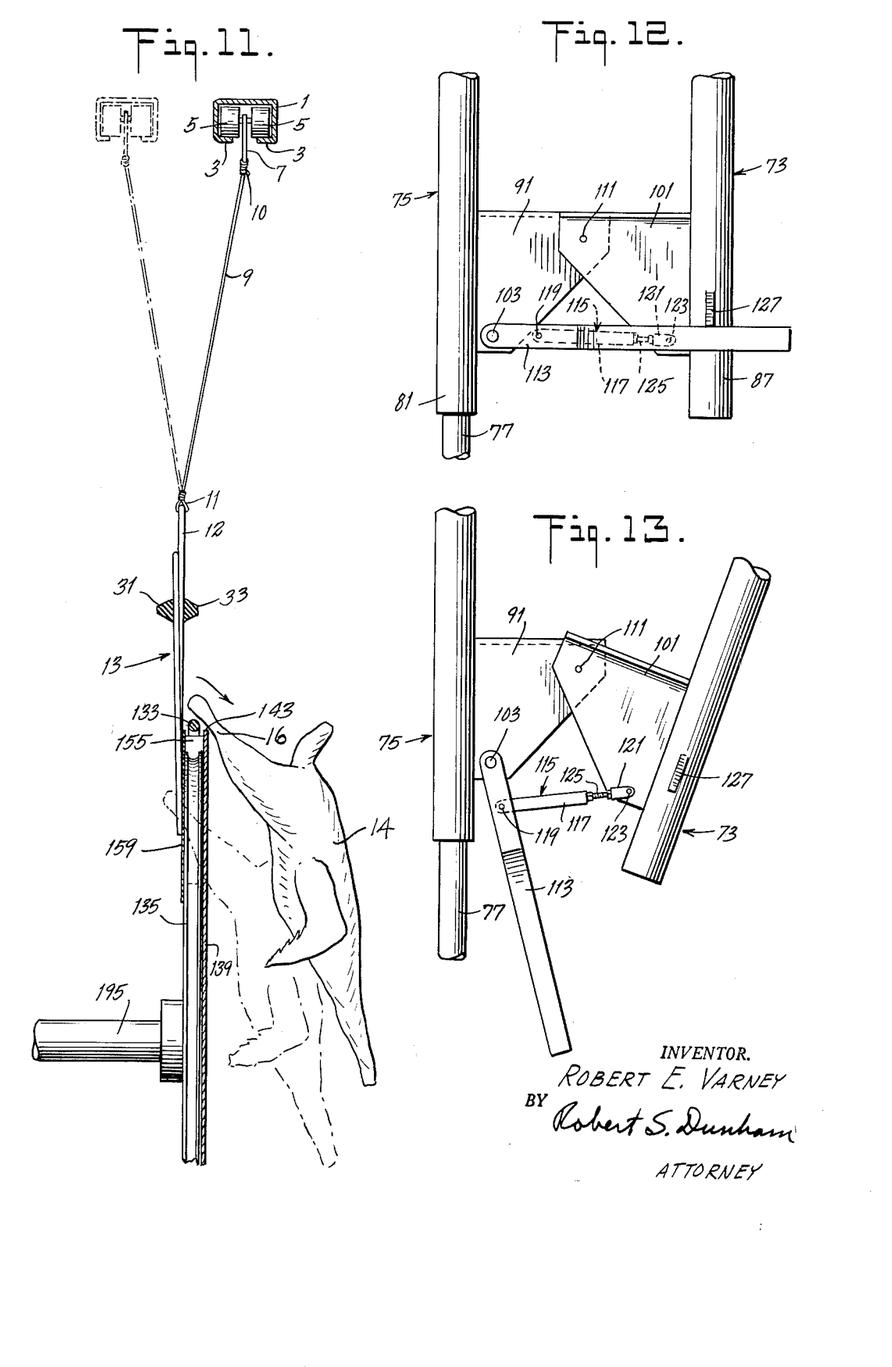
FIG. 11 shows a section taken on line 11—11 of FIG. 7.
FIGS. 12 and 13 show means for articulating two laterally spaced frames of the apparatus of the invention for pivotal separating movement of one with respect to the other and for locking these parts in the operative position.

In FIG. 1 is shown a conveyor system of conventional construction comprising a track 1 of channel section, as shown also in FIG. 11, this track having reverted flange portions 3 on which within the channel sets of rollers 5 may roll. A series of such sets of rollers 5 may be disposed in spaced relation along the track 1 and connected together by suitable linkage, not shown, so that these rollers thus linked constitute a continuous conveyor which by suitable driving means may be moved lengthwise of the track 1, for example, toward the left in FIG. 1. Connections between the two rollers 5 of each set may be provided such as to support a stirrup 7 depending between the rollers and below the reverted flanges 3 of the track. From this stirrup 7 hangs a shackle supporting element which may be a rod or wire 9 which at its upper end is provided with a loop 10 loosely engaging the stirrup 7 and at its lower end is provided with a loop 11 loosely engaging a bow 12 of the shackle 12. The loose engagement of loops 10 and 11 with the stirrup 7 and the bow 12 provides for a certain angular or torsional rotation of the shackle on a vertical line from the stirrup 7. Other means such as a chain or a flexible tension element may be used in place of the wire 9 to provide the desired swivelling of the shackle.

Figures 7, 8, 9, 10:
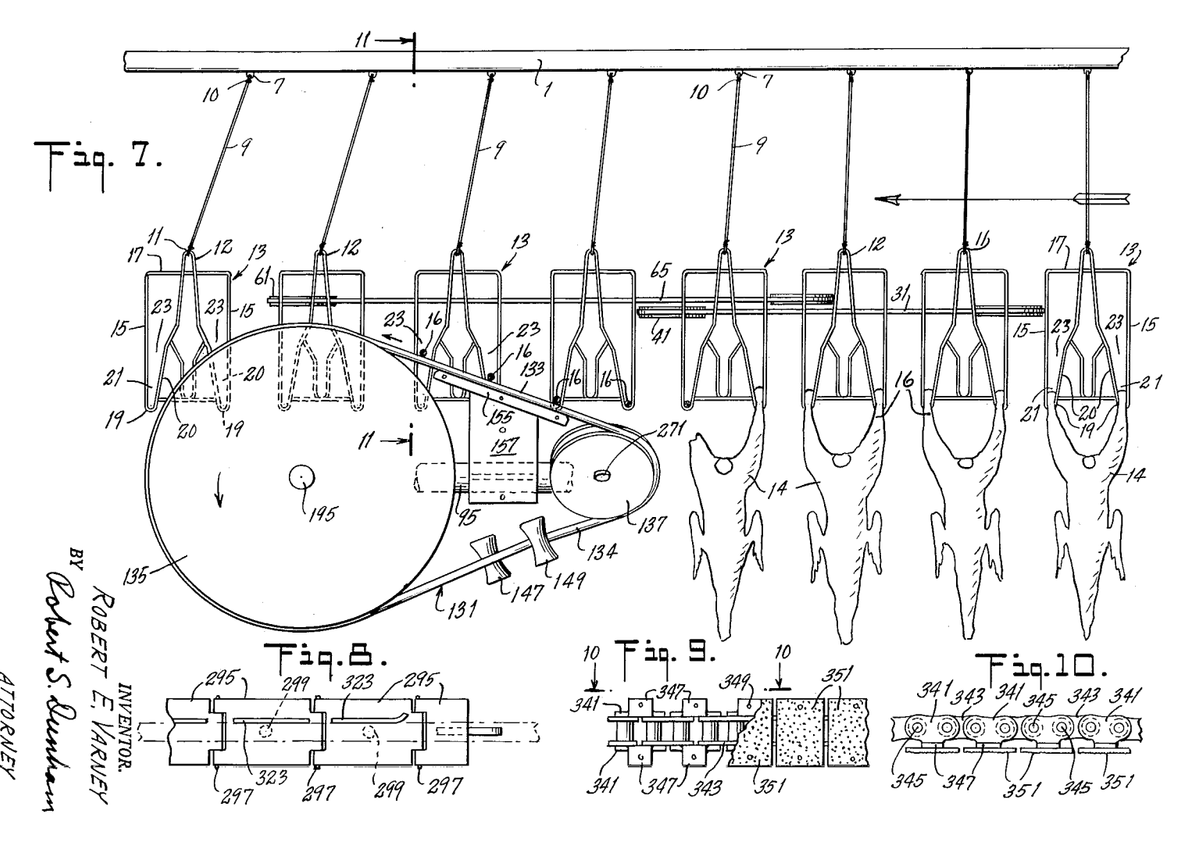
FIG. 7 shows an elevation taken on intermediate line 7—7 of FIG. 5.
FIG. 8 shows a detail of the shackle restraining means of FIGS. 5 and 6.
FIGS. 9 and 10 show a modification of the shackle engaging parts of the restraining means.

The linkage between the sets of rollers 5 may be of such extent that the bows 12 of the shackle which become disposed generally vertically below the stirrups are spaced apart sufficiently along the path of travel to provide for the arrangement of a plurality of the shackles in a succession as shown in FIGS. 1 and 7. This spacing between the sets of rollers 5 and correspondingly between the bows 12 of the shackles is such, having regard to the construction of the shackle for supporting the poultry unit, that these units 14 are spaced apart sufficiently so that they do not interfere with each other and may travel in succession along a given path. This spacing and the dimensions of the shackle desirably are such as to limit the lengthwise extent of the conveyor system required while being suitable for the dimensions of the particular type of poultry units which are being conveyed. The spacing may be varied to suit the dimensions or requirements for conveying objects of different dimensions or shapes.

As may be seen in FIGS. 1 and 7 the shackles 13 in this particular embodiment are formed from a rod of substantial diameter to provide sufficient rigidity in the frame which constitutes the shackle, this rod being bent to provide side frame elements 15 extending generally vertically connecting at their upper ends to the cross frame element 17. Adjacent the lower ends of the vertical elements 15 the rod is bent in a rather sharp U or hairpin 19, such hairpin bends being provided at each side of the shackle frame. The bent up rod portion 20 extends upwardly in inclined relation to the vertical and to the frame element 15 and forms therewith a notch 21 having an upwardly open end 23. The width of the open end 23 is such that the leg of a poultry unit 14 may be inserted and moved downwardly toward the bend 19 so as to be gripped between the element 15 and the rod portion 20, the two legs of the poultry unit being inserted in the respective notches 21. From the upper end of the inclined portions 20 the rod may be suitably bent and may extend further upwardly to form the bow 12 above mentioned to which the lower loop 11 of the wire 9 is loosely secured.

As shown in FIGS. 1 and 7 a plurality of shackles 13 may be conveyed by the conveyor toward a location in which the disengaging or unshackling apparatus of the invention is disposed, the legs of the poultry units 14 engaging the respective notches 21 and these units depending from the shackles. These shackles, as viewed at the right hand part of FIG. 1, are all disposed at the far side of a continuous bar 27 conventionally provided along which the shackles slide and which they engage substantially in a common plane, so as to maintain the poultry units 14 all disposed with the legs thereof extending from the notches at the same of the common plane, the body and other parts of each poultry unit also being disposed in like relation to this common plane and to the path of travel of the units. As mentioned above, the bar 27 is provided in connection with the conventional conveying apparatus in order to prevent during travel swivelling which is requisite in some operations and which is provided by the twisting or rotational movement which may occur because of the loose engagement of the loops 10, 11 of the suspending wire 9, or of a chain or other torsionally flexible suspending means when not prevented as by bar 27. As shown at the left of FIG. 1 where the shackles 13 have passed beyond the apparatus of the invention and are suspended loosely from the conveyor by the wires 9, these shackles 13 may become disposed in different angular relations to each other out of the common plane. Provision may be made for again engaging the shackles by a bar or other conventional means for securing alignment for further travel of the shackles if desired.

Reference now will be made more particularly to FIGS. 1, 5 and 7 in which at the right the shackles 13 move toward the left while in engagement with the bar 27. As the shackles move out of engagement with the bar 27 they enter the first zone of the travel thereof in which the first mechanical action of the three principal parts of the apparatus of the invention above generally mentioned is brought to bear upon the shackles. It will be noted in FIGS. 1 and 7 that the shackles 13 at the right are more closely spaced than in the next portion of the travel toward the left. The closely spaced shackles 13 at the right, as they leave engagement with the bar 27 and travel toward the left, become disposed between the adjacent stretches 31, 33 respectively of two feed belts 35, 37 extending over grooved pulleys 39, 41 and 43, 45. The shackles are brought in succession into engagement with one or the other or both of the stretches 31, 33 depending on the position of the individual shackle to which it may become rotated about the vertical as it is freed from the bar 27. The bar 27 and the belts 35, 37 supported on the pulleys 39, 41 and 43, 45 may be disposed so as to be generally in a vertical plane which is somewhat offset horizontally away from the viewer in FIGS. 1 and 7, upwardly in FIG. 5, from the vertical plane of the conveyor track 1. This offset may be seen in FIG. 11 to be described further in connection with the shackle restraining means.

Figure 5:
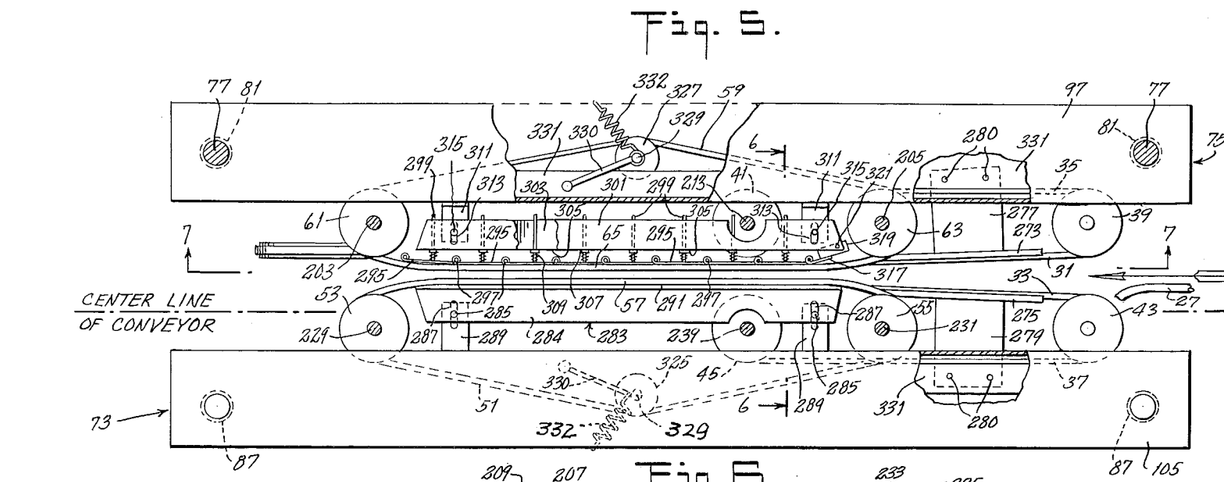
FIG. 5 shows in plan the alignment controlling means and the means for restraining the shackles against movement thereof transverse to their travel.

Because of this offset, however, the weight of the shackle and of the poultry unit carried thereby biases the shackle and its unit in the direction toward the observer in FIGS. 1 and 7, downwardly in FIG. 5, into engagement with the stretch 33 of the belt 37. The shackle is moved toward the left by the frictional engagement thereof with the moving stretch 33. It will be noted that the stretches 31 and 33 are inclined with respect to each other in the horizontal plane and are more widely spaced at the right hand part thereof than at the left hand end of these stretches. A shackle which may become angularly displaced upon moving out of engagement with the bar 27 may engage both stretches 31, 33 but will be rotated gradually on its vertical axis to a position with the plane of the frame of the shackle generally parallel to the direction of travel thereof, so that each shackle will be in a position to be engaged properly by the shackle gripping or restraining means about to be described to which it is delivered by the belt 33 or by the belts 31 and 33 in cooperation with the conveyor the roller 5 of which are traveling along the track 1.

By means further to be described pulleys 41 and 45 are rotatably driven so as to drive the belts 35, 37 with a lineal speed of the stretches 31, 33 thereof which is somewhat greater than the speed of the conveyor, so that in the initial contact of the shackles with the stretch 33 or with the stretches 31 and 33 the shackles are moved apart from the close relation shown at the extreme right in FIG. 1 to a somewhat greater spacing as shown at the right in FIG. 7 in the zone of engagement with stretches 31, 33. The spacing of the poultry units 14 is further increased upon entering the second zone of action to insure that interference of one unit with an adjacent unit is avoided and to make it possible that the means for lifting the poultry unit from the shackle as hereinafter described shall act individually and separately on the respective poultry units. The supporting or suspending elements 9 in FIG. 7 in the first and second zones of action are shown inclined to the vertical because of the increased spacings as compared to the fixed spacing of consecutive sets of rollers 5 of the conveyor. In the second zone of action in which the shackles travel with the further increased spacing therebetween, the supporting elements 9 will become disposed in somewhat greater inclined relation to the vertical. In some cases the path of travel of the shackle through these two zones is inclined upwardly along the conveyor to accommodate to the inclination of the rods or elements 9.

As may be seen in FIGS. 1, 5 and 7, in the left hand part of the first zone of action in which the shackles are confined for alignment by the belt stretches 31, 33 and in which they first become disposed in increased spaced relation as compared to the connection of the elements 9 to the conveyor, the right hand part of an endless belt 51 is disposed which is supported by V-groove pulleys 53, 55 with a stretch 57 thereof in general alignment with the stretch 33 of the belt 37. Another belt 59 is supported by V-groove pulleys 61, 63 with a stretch 65 thereof extending in general alignment with the stretch 31 of the belt 35. The stretches 57 and 65 respectively of the belts 51 and 59 are disposed closely adjacent each other and means are provided to back up the stretch 57 against movement transversely of its length and, on the other hand, means are provided for backing up the stretch 65 of the belt 59 yieldingly to bias the stretch 65 toward the stretch 57. The stretch 65 of the belt 59 under this bias may be disposed sufficiently toward the stretch 57 so that a shackle moved by belt 31 or belts 31, 33 into engagement with the belts 51, 59 adjacent the pulleys 55, 63 may be gripped between the two stretches 57, 65 and held with the side frame rod elements 15 of this shackle as well as its inclined rod portions 20 forming the notches 21 in the vertical plane between the two belt stretches 51, 59. The bias means referred to effects a gripping action of the stretch 65 upon the shackle frame backed up by the stretch 57, so that the shackle is gripped and restrained against movement in the vertical plane transversely of the path of travel, particularly against upward movement of the shackle. This restraint against upward movement is requisite to effect disengagement of the legs of the poultry units 14 concomitantly with the lifting movement of these legs upwardly out of the notches 21 by the disengaging means about to be described.

By means to be described, pulleys 53 and 61 are rotatably driven to drive belts 51, 59 at such a lineal speed that the stretches 57, 65 travel toward the left at a speed somewhat greater than the speed of the stretches 31, 33 of the belts 35, 37 which themselves travel at a speed somewhat greater than the rate of travel of the conveyor in the track 1. Thus, the increased spacing of the shackles 13 effected by the action of the belt 33 or by both belts 31, 33 is still further increased upon initial engagement of the shackles with the belts 57, 65 and the shackles remain in the attained increased spaced relation throughout the travel of the shackles in the zone of gripping engagement by the belt stretches 57, 65. Upon passing out from between the stretches 57, 65 at the left hand of FIGS. 5 and 7, the shackles again are free of restraint and may take different angularly related postions about their vertical axes relative to the path of travel, as shown at the left in FIG. 1. The elements 9 then are released again to hang vertically from the conveyor rollers 5.

Figure 2:
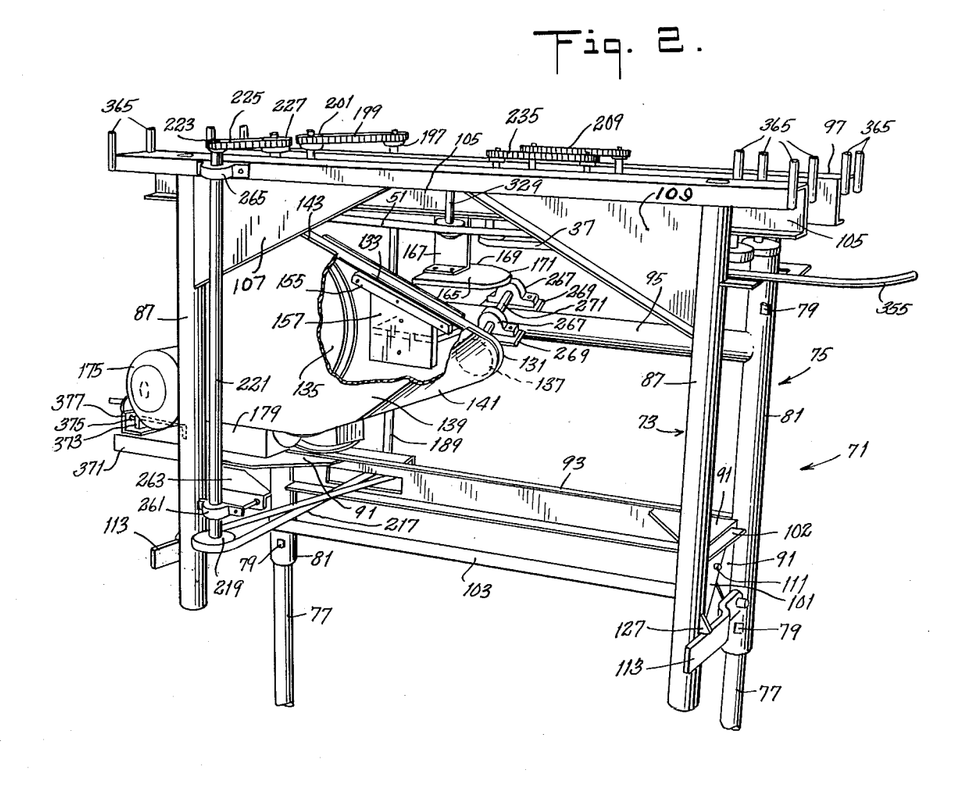
FIG. 2 shows in different perspective the disengaging apparatus of the invention viewed at the same side as in FIG. 1.

The endless belts 35, 37 and 51, 59 which have been described thus far are supported in a supporting structure 71 having two frames 73, 75 which are articulated so that pivotal movement of one may take place with respect to the other. As shown in FIG. 1, the frame 75 may be supported by standards 77 of suitable form, for example, vertical pipes having flanges secured to the floor or other base support, these pipes 77 entering and being secured by suitable means, such as set screws 79, to vertical tubular legs 81 of the frame 75. The frame 75 may be suitably braced at the upper part thereof to a support member or the pipe supports 77 may extend through the respective tubular legs 81 upwardly to structural members of the building or suitable brackets supported thereby to which the pipes 77 may be secured. The frame 73 in the operating position thereof is supported in the generally parallel relation to the frame 75 as shown in FIGS. 1, 2 and 12 in which the legs 87 of the frame 73 are disposed vertically in parallel relation to the legs 81 of the frame 75. When the two frames thus are disposed with their legs vertical, the belt stretches 57, 65 are disposed in the closely adjacent relation of FIG. 5 for gripping the shackles delivered therebetween by the belt 33 or by the belts 31 and 33.

By virtue of the above mentioned pivotal articulation of the two frames 73, 75, these frames and the respective belts carried thereby may be separated for access to the belts which engage the shackles as well as to the means to be described for lifting the poultry units for disengagement thereof from the shackles. Because, as will be understood from further description, the poultry units are brought into contact with means provided in the machine which effect the lifting of the poultry units, these parts must be cleaned periodically and on occasion adjustments may be required for proper action thereof. Moreover, when the frames 73, 75 are separated, poultry units may be carried through the restraining zone without being removed from the shackles. The details for supporting and driving the two sets of belts as well as the poultry unit lifting means will be further described hereinafter. The pivotal articulation of the two frames 73, 75 however, is provided by means of brackets 91 which are secured as by welding respectively to the legs 81 of the frame 75 and to a channel member 93, FIG. 2, which extends horizontally between these two legs 81 adjacent the lower portion thereof and is welded to the respective legs 81. It will be seen in FIGS. 1 and 2 that the brackets 91 are formed with vertical webs welded to the legs 81 as well as with horizontal webs welded to the upper flange of the channel member 93. Thus, there is provided a rigid connection of the brackets 91 to the frame 75 and strong bracing of the frame by virtue of the connections of the vertical and horizontal webs to the legs 81 and to the channel member 93. The frame 75 comprises also an additional horizontal tie member 95, FIG. 2, and an upper channel member 97 extending horizontally and parallel to the channel member 93 and the tie member 95. The pipe supports 77 may extend upwardly through holes in the upper flange of the channel member 97 where the upper ends of the legs 81 are secured to the channel member 97 as by welding, FIGS. 5 and 6.

The frame 73 also may be provided with brackets 101 the vertical webs of which. similarly to the brackets 91, may be welded to the respective legs 87 of the frame 73. These brackets 101 may have horizontal stiffening flanges 102. Similarly to the horizontal webs of the brackets 91 the brackets 101 may comprise horizontal webs providing support for parts of the drive mechanism. The upper ends of the legs 87 may be connected to a channel member 105 similar to the channel 97, this channel 105 being connected by gussets 107, 109 respectively to the legs 87 for rigidly bracing these legs and the channel at the upper end of the frame 73. Similar gussets, not shown, may be provided for legs 81 and channel 97 of frame 75.

The webs 101 are disposed in lapping relation to the webs 91 at the respective ends of the frames 73, 75 and are pivotally connected at the respective ends by pivot pins 111. It will be understood from a consideration of FIGS. 1, 2, 12 and 13 that the frame 73 as a whole may pivot on the pins 111 to a position in which the frame 73 is angularly related to the frame 75, as shown in FIG. 13, and the belt 51 and its stretch 57 thereby become spaced from the belt 59 and its setretch 65. The stretches 31 and 33 of belts 35, 37 also become spaced apart. The change in position of the frame 73 relative to frame 75 and of the legs 87 relative to legs 81 from the operating position shown in FIGS. 1, 2 and 12 to the "open" position is shown in FIG. 13.

In order to retain the legs 81, 87 in the operating relation shown in FIG. 12, and to provide for separating movement of the frames 73, 75, toggle means is utilized comprising levers 113 secured to a pivot rod 103 extending between the through holes in the vertical webs of the brackets 91. An adjustable connecting rod 115 is provided having a main part 117 connected by pin 119 to the lever 113 at a point outwardly disposed along the lever 113 from the axis of the pivot rod 103. The other end of the connecting rod 115 is provided by part 121 pivotally connected by pin 123 to the vertical web of bracket 101 of the frame 73. The part 131 is connected by a threaded adjusting rod 125 and nuts threaded thereon to the main part 117 of the connecting rod 115. As will be understood from a consideration of FIGS. 12 and 13, the lever 113 and its associated parts constitutes a toggle. In the position of FIG. 12 where the line connecting the pin 119 with the pin 123 is disposed at a slight angle to the center line of the lever 113 through the axis of the pivot rod 103 and the pin 119 is above this center line, the toggle action locks the two frames 73, 75 against pivotal movement. Upon moving the lever 113 downwardly to the position of FIG. 13 the toggle action is broken and the frame 73 may move pivotally on the pin 111. In the upwardly disposed position of the lever 113 as shown in FIGS. 1, 2 and 12 the top edge of this lever engages a stop 127 which prevents further movement upwardly of the lever 113, thus to maintain the toggle mechanism in the locked position as described above, to maintain the frame 73 with its legs 87 vertical and the belt stretches 31, 33 and 57, 65 in their cooperating positions.

In this operating position of the frames the shackles carrying the poultry units which travel from the zone of engagement with the belts 31, 33 into the zone of engagement of the belt stretches 57, 65 are gripped by the belts 57, 65 and restrained against movement vertically as well as against change in position in the vertical plane of their travel. The shackles are biased into engagement with the belt stretch 57 and are pressed against this stretch by the bias means mentioned above which backs up the belt stretch 65. The poultry units are disposed at that side of the plane of each shackle which is disposed toward the vertical plane of the conveyor, that is, toward the observer in FIGS. 1 and 7, and toward the right in FIG. 11. The body portion of each poultry unit becomes disposed somewhat to the right of the vertical plane of the shackle as it is biased into engagement with the belt stretches 57, 33. The disengaging means for lifting the poultry units in succession out of their respective shackles by disengaging the legs of these units from the notches 21 is constructed to take advantage of this disposition of the poultry units in relation to the shackle, the poultry units in their travel through the restraining zone between belt stretches 57, 65 and through the zone of disengagement being maintained in this offset relation to the shackle. Thus these poultry units, as they are engaged by the disengaging means, travel at the side of this disengaging means toward the observer in FIGS. 1, 2 and 7, and the shackles travel at the opposite side of the disengaging means, that is, away from the observer in FIGS. 1, 2 and 7. The shackles remain suspended from the stirrups by means of wires 9 and are carried forward by the restraining belt stretches 57, 65 until the legs of the poultry unit are completely disengaged from the notches 21. The shackles then travel out of engagement with the belt stretches 57, 65 as shown at the left in FIG. 7 and continue their travel with the conveyor in the unrestrained relation indicated at the left in FIG. 1.

Figures 3, 4, 14:
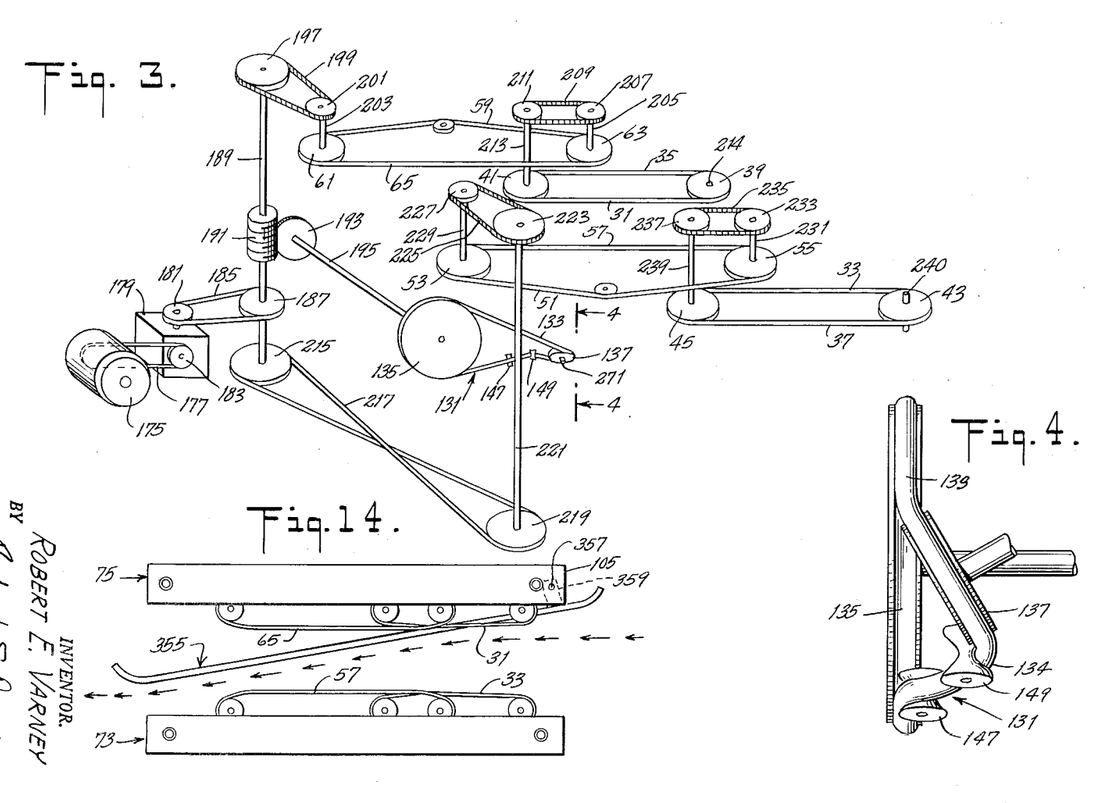
FIG. 3 shows diagrammatically the shackle aligning control means the shackle restraining means and the poultry unit disengaging means of the apparatus of the invention and driving means therefor.
FIG. 4 is an elevation to enlarged scale taken on line 4—4 of FIG. 3 showing the belt and pulley system of the disengaging means.
FIG. 14 shows a deflector bar for the shackles functioning when the frames are separated.

For effecting the lifting movement of the poultry units the shackles, as they travel toward the left in FIG. 7 in the restraining zone between the belt stretches 57, 65, come into engagement with the upper stretch 133 of an endless belt 131 extending about a grooved driving sheave 135 and about a small idler sheave 137. Preferably the belt 131 is of circular section and the upper stretch 133 thereof is inclined in the direction upwardly from the upper circumference of the idler sheave 137 toward the upper side of the driving sheave 135 which rotates in the direction of the arrow in FIG. 7. As shown in FIGS. 2, 3 and 7 the idler sheave 137 is rotatable on an axis which is inclined to the vertical plane in which the driving sheave 135 rotates. This inclined relation of the sheave 137 serves to dispose the lower portion of the sheave 137 further away from the poultry unit, particularly the body portion of this unit, as it travels into the disengaging zone. Moreover, this inclination provides for a camming action to be brought upon the poultry units in succession to move the body portions thereof somewhat toward the observer in FIG. 7 by sliding engagement with the exterior smooth surface of a part of a casing 139 which, as shown in FIG. 2, covers the near side of the sheave 135 and the sheave 137. This casing 139 is bent to dispose the portion 141 covering the sheave 137 at an angle to the main surface so as to provide the camming surface. The casing 139, 141 extends to an upper edge 143 close to and conforming to the belt 131 and the peripheries of the sheaves on which the belt travels. This casing, however, does not extend over the upper side of the upwardly inclined stretch 133 of the belt 131.

As may be seen also in FIG. 11, the upper side of the circular circumference of the belt projects beyond the upper edge 143 of the casing 139 so that, as the legs 16 of the poultry units in succession are brought into engagement with the stretch 133, as shown in FIG. 7, they are moved upwardly gradually concomitantly with linear movement of the stretch 133 until the ends of the legs reach the open ends 23 of the notches 21 of the shackles. In this movement the stretch 133 holds the legs clear of the edge 143 of the casing and thus prevents damage to the legs. As shown in FIGS. 1 and 7, at some position along the stretch 133 before the shackle 13 engaged by the two legs of the poultry unit reaches the position adjacent the vertical diameter of the driving sheave 135, the legs 16 of the poultry unit are disengaged from the shackle notches and the weight of the body portion of the unit, even though in some cases it may bear on the casing 139, will tip the legs out of the notches and the poultry unit will fall upon a deflector 145 and will also be downwardly moved along this deflector into a trough 147 from the lower end of which it may be delivered to a suitable receiver for further treatment or for packing. As may be seen in FIG. 7, when the shackle from which the poultry unit has just been disengaged reaches a position adjacent the upper side of the driving sheave 135, it then passes out of engagement with the restraining belt 65, FIG. 7, that is, out of the gripping engagement of the belt stretches 57, 65, FIG. 5.

The upper part of the circumference of the idler sheave 137 is disposed substantially in the plane of the driving sheave 135 and the pull of the inclined stretch 133 of the belt 131 effected by the driving sheave 135 effects rotation of this sheave 137. The lower circumferential part of the sheave 137 is disposed in offset relation to the plane of the sheave 135 in the direction away from the observer in FIG. 7 and it is necessary to provide for return movement of the return part 134 of the belt 131 so as properly to come into circumferential engagement with the lower portion of the sheave 137. To this end an idler spool 147 is disposed at the far side of the part 134 in FIG. 7 and a second idler spool 149 is disposed at the near side of the part 134 in this figure. The portion of the return part 134 that is in the plane of the sheave 135 as the belt leaves this sheave passes over the spool 147 and then over the spool 149 with the portion of the return part 134 extending between spools 147, 149 in inclined relation to the adjacent portions of the return part 134 of the belt 131. The return part 134 is thus directed to the sheave 137 in the plane thereof, as also shown in FIG. 4.

It will be understood that a substantial weight of the poultry unit or units is brought upon the inclined stretch 133 of the belt 131. To prevent sagging of this stretch and to back up the action of the shackles as they travel continuously toward the left in FIG. 7, a backing bar 155 is disposed beneath the portion of the stretch 133 which is clear of the sheaves 135, 137, this bar being supported by a plate 157 secured by suitable connections and fasteners upon the horizontal tie member 95, FIG. 2. Thus the belt stretch 133 gives positive movement upwardly to the legs 16 of the poultry unit as the shackles move the legs forwardly, the speed of the belt stretch 133 along the incline being concomitant with the speed of the belt stretches 57, 65. The legs thus are disengaged from the notches 23.

A back cover 159, a portion of which is shown in FIG. 11, may be supported from the tie member 95, FIG. 2, adjacent and at the side of the sheave 135 away from the observer to provide for sliding engagement by and to separate the lower portions of the shackles 13 from the poultry units as the shackles travel by the upper part of the sheave 135 until they are out of position, toward the left in FIG. 7, for engaging this sheave. In some cases, however, by providing a smooth back surface for the sheave 135 the back cover 159 may be omitted. To preserve a smooth surface on casing 139, 141 countersunk fasteners 156 passing through the upper edge of the casing and threaded into holes in the bar 155 may be used. Additional fasteners 156 may pass through the casing 139 into threaded engagement with the plate 157 for securely holding the casing 139, 141. The back cover 159 also may be secured by similar means to the bar 155 and the plate 157.

To ensure travel of the shackles rearwardly of the poultry unit disengaging means, that is, at the far side of the backing cover 159 as the poultry unit itself travels in sliding relation to the casing 139, 141 at the near side of the disengaging means, as shown in FIGS. 1, 2 and 7, a camming plate 165 is supported by means of a bracket 167 secured to the upper channel member 105 with the edge 169 thereof away from the observer in FIGS. 1 and 2 disposed so as to be engaged by the shackle which thereby is cammed away from the observer and beyond the vertical plane of the back cover 159 to ensure that this shackle travels forwardly at the opposite side of the belt stretch 133 from the legs of the poultry unit. The camming plate 165 is formed with a curved camming surface 171 initially engaged by the shackle as it moves toward the left in FIGS. 1 and 2. It will be noted in FIG. 1 that the camming plate 165 is disposed in a position to engage the shackles just after they leave engagement with the stretch 33 of the feed belt 37. The shackles now are gripped by the stretches 57, 65 of the belts 51, 59. These belts, however, engage each shackle adjacent its upper part as shown in FIG. 7, so that slight tipping movement may occur as the shackle at its lower portion is engaged by the camming plate 165 to deflect it so that it travels at the far side of the shackle disengaging means, as above described.

In order to drive the feed belts 35, 37 and the shackle restraining belts 51, 59 as well as the disengaging belt 131, a drive system is shown in FIG. 3 which includes shafts, chains and belts driven by a motor 175 which may be a constant speed motor. This motor through belt 177 drives a speed reducer 179 which may provide a substantially reduced speed of the pulley 181 on a vertical shaft of this speed reducer with respect to the speed of the input pulley 183 of this reducer. The ratio of reduction may be 1 to 17.5, for example. A further modification in speed, a smaller reduction as shown, may be effected in the drive from the pulley 181 by means of belt 185 to the pulley 187 on a main vertical shaft 189 supported as hereinafter described by frame 75. If desired, the pulley 181 or the pulley 183 or both may be a conventional variable speed type which provides for change in the effective diameter by moving two parts of a V groove pulley axially toward or away from each other. The shaft 189 carries a worm 191 engaging worm wheel 193 secured on horizontal shaft 195. The ratio of this worm and wheel drive may be 7.5 to 1. The driving sheave 135 is secured on the end of the shaft 195 for driving the disengaging belt 131 as above described. The diameter of the sheave 135 determines the speed of the belt 131 and may be such that the horizontal component of this speed is substantially the same as the speed of the belt stretches 57, 65.

On the upper end of the main vertical shaft 189 is secured sprocket 197 for a chain drive 199 the driven sprocket 201 of which is secured on the upper end of vertical counter shaft 203 on the lower end of which is secured the pulley 61 engaged by belt 59 for driving this belt as above mentioned. The belt 59 drives the pulley 63 secured on the lower end of vertical transfer shaft 205 on the upper end of which is secured sprocket 207 driving chain 209 which in turn drives the driven sprocket 211 secured on the upper end of vertical auxiliary shaft 213 on the lower end of which is secured the pulley 41 which drives shackle aligning or feed belt 35 extending over the pulley 41 and the idler pulley 39, as above described. It will be seen that this train of drive elements is effective to drive, in addition to the poultry unit lifting belt 131, both the shackle gripping belt 59 and its stretch 65 and the shackle aligning or feed belt 35 and its stretch 31.

A pulley 215 secured on the lower end of the main vertical shaft 189 drives through crossed belt 217 a pulley 219 secured to the lower end of a second main vertical shaft 221 at the upper end of which is secured sprocket 223 driving chain 225 which in turn drives the sprocket 227 secured on the upper end of vertical counter shaft 229 on the lower end of which is secured the pulley 53 which drives the belt 51 the stretch 57 of which in cooperation with the stretch 65 serves to restrain the shackles, as above described. The belt 57 drives the pulley 55 carried on the lower end of vertical transfer shaft 231 on the upper end of which is secured sprocket 233 driving chain 235 which in turn drives sprocket 237 secured on the upper end of vertical auxiliary shaft 239 on the lower end of which is secured the pulley 45 which drives the shackle aligning or feed belt 37 extending about the idler pulley 43. The belt 217 driving the pulley 219 from the pulley 215 is crossed in order that the direction of movement of the stretch 57 of the belt 51 and the stretch 33 of the belt 37 shall be the same respectively as the stretch 65 of the belt 59 and the stretch 31 of the belt 35.

The ratios of the effective diameters of the pulleys in the respective belt drives as well as of the sprockets of the chain drives may be such as to secure the desired forward speed of the belt stretches 31, 33 and 57, 65 in relation to the speed of the conveyor which effects travel of the shackles and the poultry units supported thereby, having regard to the greater speed of the stretch 33 or the stretches 31 and 33 relative to the conveyor speed in order to effect the initial separation of the shackles as described in connection with FIGS. 1 and 7. These ratios of pulley diameters and sprocket diameters also may be chosen to secure the speed of the stretches 57, 65 which is somewhat greater than that of the stretches 31, 33 as above described to secure further separation of the shackles while holding them to effect the forward travel thereof through the restraining zone while preventing lifting thereof by the belt 133. The ratio of speed reduction in the speed reducer 179 may be such as to secure effective and safe speeds of travel of the belts and of the shackles and the poultry units supported thereby while utilizing in the motor 175 normal or conventional motor speeds. It will be understood that the lineal speed of the belt 131 corresponding to that of the lineal speed of the stretches 57, 65 in the restraining zone as above mentioned, should be such that severe abrasive action of the belt stretch 133 on the legs of the poultry units is avoided.

Figure 6:
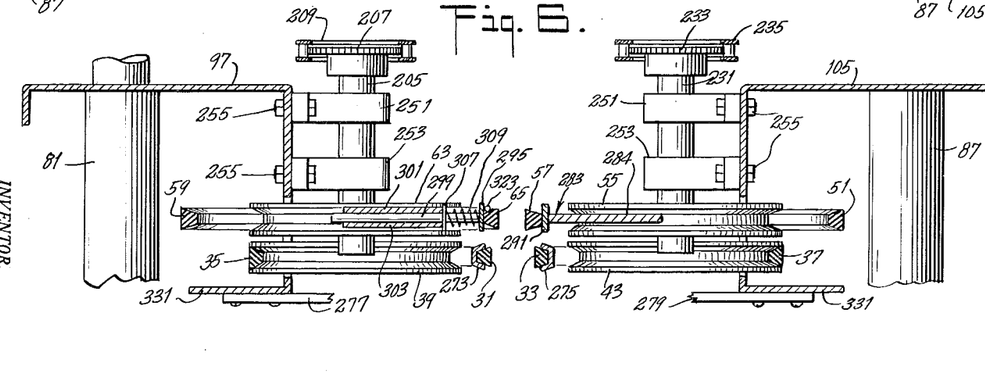
FIG. 6 shows a section on line 6—6 of FIG. 5.

For supporting the main vertical drive shafts 189, 221 and the counter shafts 203, 229 which respectively directly drive the belts 59, 51, as well as for supporting the transfer shafts 205, 231 driven by the belts 59, 51 and the auxiliary shafts 213, 239 driving the aligning or feed belts 35, 37, a pair of bearings may be provided for each of these shafts which find support on the upper channel members 97, 105 of the frames 75, 73 or on brackets or plates supported by the legs 81, 87. Typically, as shown in FIG. 6, bearings 251, 253 are secured by bolts 255 to the vertical web of the upper channel member 97 which is supported by the legs 81. These bearings support the transfer shaft 205 for rotation on the vertical axis, this shaft carrying on its upper end the sprocket 207 driving the chain 209. At its lower end and below the bracket 253 the shaft 205 carries a pulley 63 which is driven by the belt 59. The idler pulley 39 is shown in FIG. 6 supporting the belt 35 and itself may be carried by vertical idler shaft 214 and supported similarly to shaft 205 in other bearings 251, 253, this vertical idler shaft and its bearings being omitted in FIG. 6 for clarity. Similarly, at the right hand side of FIG. 6, the vertical transfer shaft 231 is shown supported in bearings 251, 253 secured by bolts 255 to the vertical web of the upper channel member 105 which is supported on the upper end of the legs 87. The pulley 55 driven by the belt 51 and driving the transfer shaft 231 is carried at the lower end of the shaft 231 at the upper end of which is secured to sprocket 233 which drives the chain 235 driving the vertical auxiliary shaft 239. The idler pulley 43 over which the belt 37 extends is shown beneath the pulley 55, the vertical shaft 240 on which the pulley 55 is secured being omitted in FIG. 6 to avoid confusion.

It will be understood, by virtue of the pivotal articulation of the frames 73, 75, that the bearings and the several vertical shafts mounted therein which respectively are carried by the upper channel members 97 and 105 may be moved apart by movement of the frames to the position shown in FIG. 13 and that thereby access may be had to these bearings and to the several shafts, pulleys, belts and chain drives for adjustment and repair.

As shown in FIGS. 1 and 2 the lower end of the long main vertical shaft 221 is supported in a bearing 261 secured to a bracket 263 which is fastened as by welding to the horizontal web of the bracket 101 which, as above described, is secured to the vertical leg 87 at the left in FIG. 1. The upper end of the shaft 221 may be supported in a bearing 265 as shown in FIGS. 1 and 2 secured to the outer flange of the upper channel member 105. Similar bearing support may be provided for the vertical shaft 189 supported in the frame 75 to effect the drive in this frame as described in connection with FIG. 3. The pulley 219 at the lower end of the shaft 221 is shown in FIGS. 1 and 2 and the crossed belt 217 also is shown which drives shaft 221 from the shaft 189.

The upper end of the shaft 189 may be carried in a bearing similar to the bearing 265 but supported on the upper channel member 97 of the frame 75. As shown in FIG. 2 the chains 199 and 225 drive respectively the sprockets 201 and 227 secured on the upper ends of the shafts 203 and 229 for driving the shackle restraining belts 59 and 51. The chains 209 and 235 of FIG. 3 also are shown just above the upper channel members 97 and 105 in FIG. 2.

As shown in FIG. 2 bearings 267 are fastened to respective plates 269 which are secured as by welding to the horizontal tie member 95. These bearings 267 support shaft 271 disposed with its axis at an angle to the horizontal and to the vertical plane of the belt 131, as indicated diagrammatically in FIGS. 3 and 7, the shaft 271 carrying at its end the idler pulley 137 over which the belt 131 passes. The idler pulley 137 thus becomes disposed with its plane in inclined relation to the vertical plane of the driving sheave 135 for the purpose above described.

As shown in FIG. 5 the stretches 31, 33 respectively of the belts 35, 37 are engaged by backing bars 273, 275 respectively secured as by welding to plates 277, 279 which by suitable fasteners 280 may be supported respectively on the bottom flanges of the upper channel members 97, 105. The bars 273, 275 may be of channel section, the stretches 31, 33 of the belts running in these channels, as may be seen in FIG. 6. Lateral deflection of the stretches 31, 33 by shackles engaging these stretches thus is prevented and rotatively displaced shackles are turned toward the position with their planes parallel to the direction of travel thereof toward the restraining zone as above described.

In this restraining zone the stretch 57 of the belt 51 also is backed up by a rigid backing member 283 which may be of T-section, as shown in FIG. 6, having a horizontal web 284 secured by bolts 285, FIG. 5, engaging slots 287 in the web 284 and passing through holes or slots in brackets 289 secured by suitable means, not shown, to the upper frame member 105. The slots 287 provide for adjustment of the backing member 283 transversely of the belt stretch 57.

As shown in FIG. 6 this backing member 283 is provided with a vertical flange 291 against which the belt stretch 57 bears as it moves toward the left in FIG. 5 in sliding relation to the surface of the flange 291. It will be understood that the rigid member 283 and its flange 291 serve to prevent lateral displacement of the belt stretch 57 so as to maintain this stretch in proper alignment with and for engagement by the shackles during travel thereof through the restraining zone.

The belt stretch 65 extends along a structure providing for backing up this stretch as well as for biasing it toward the belt stretch 57, as above mentioned, in order to grip the shackles between the belt stretches 57 and 65 as the shackles move toward the left in this restraining zone. This structure comprises a plurality of contact plates 295 which are hinged together by hinge pins 297, FIGS. 5 and 8, so that the individual plates 295 may pivotally move on the hinge pins with respect to each adjacent contact plate. To the rear face of each of the hinge plates 295 is secured as by welding a stud 299 extending perpendicular to the plane of the plate 295. These studs are disposed between an upper guide plate 301 and a lower guide plate 303, FIGS. 5 and 6, between which they moved slidably in the direction perpendicular to the belt stretch 65 to dispose the hinge plates 295 closer or further away from the belt stretch 57. In engagement with the edges 305 of the plates 301, 303 and slidably disposed on the rods 299 are washers 307 between which and the hinge plates 295 are disposed compression springs 309. These springs bias the respective hinge plates 295 toward the belt 57 concomitantly with sliding movement of the pins 299 between the guide plates 301, 303. Having regard to the articulation of the plates together at the hinge pins 297, it will be clear that the whole strecth 65 of the belt 59 may be biased toward the belt stretch 57 while at the same time accommodating to variations in the angular positions of the shackles, their thickness or transverse dimensions and the variations which may occur which make necessary slight movement of the two belt stretces 57, 65 toward and away from each other to provide the gripping action while avoiding jamming.

The guide plates 301, 303 may be supported by brackets 311 secured by suitable means such as welding to the upper channel member 97 of the frame 75. The guide plates 301, 303 may be provided with slots 313 through which extend bolts 315 which also extend through holes in the brackets 311, thus to provide for adjustment of the guide plates toward or away from the line of travel of the shackles, that is, toward or away from the belt stretch 57 to provide a basic or initial setting of the hinge plates 295 from which they may move under the action of the springs 309 as above mentioned.

At the right hand end of the series of hinge plate 295 is hingedly connected an anchor plate 317, FIG. 5, which may be secured by suitable means including a lug 319 and pin 321 to the right hand end of guide plates 301, 303. It will be understood that the belt stretch 65 moving toward the left in frictional engagement with the series of hinge plates 295 will tend to pull this series toward the left. The anchor plate 317 secured as described to the plates 301, 303 prevents the left hand movement of this series of hinge plates so that the stretch 65 slides toward the left in frictional engagement with the vetrical surface presented by this series of hinge plates.

As shown in FIGS. 6 and 8 the hinge plates 295 may carry retaining bars 323 which may be secured as by welding to the face of the hinge plates 295 at the upper portion thereof so that, as shown in FIG. 6, the belt stretch 65 moves in engagement with the hinge plates 295 below the retaining bars 323. Thereby the belt stretch 65 is prevented from riding upwardly when the vertical component of force is brought upon the shackle as the legs of the poultry unit supported by the shackle come into engagement with the inclined belt 133 and until these legs are released from the frictional engagement with the elements 15, 20 which form the leg retaining notches 21 of the shackle. These retaining bars 323 also may resist upward components of other forces which may be brought upon the restraining belt 65 as the shackle is drawn forwardly in its travel supported by the conveyor.

The return of the belts 51, 59 may pass over take up pulleys 325, 327 which may be supported as shown in FIG. 2 for rotation on studs 329 which may be carried by arms 330 pivoted on the lower flange 331 of the respective top channel members 105, 97. A tension spring 332 is connected at one end to the stud 329 and is hooked at its other end in a hole in the upper flange of the respective upper members 97, 105 to bias the studs 329 and the take up pulleys 325, 327 in the direction to take up and tighten the belt 59.

In FIGS. 9 and 10 is shown a modification of the parts of the shackle restraining means which in the embodiment above described, comprises belt stretches 57, 65 respectively of the belts 51, 59. In place of these belts a chain is used comprising chain links 341 and connecting links 343 which are pivotally engaged with each other by pins 345 in the manner of a conventional chain. The chain links 341, however, each are provided with lugs 347 extending at opposite sides of the length of the chain, FIG. 9, and parallel to the pivot pins 345. Lugs 347 have holes 349 through which pass rivets or other fasteners securing to these lugs face elements 351. These face elements may be of rubber or plastic or other suitable material preferably adapted more or less resiliently to engage the shackle frame as do the belt stretches 57, 65. The length of the links of the chain structure between the pins 345 shown and described in connection with FIGS. 9 and 10 and the pitch of the corresponding sprockets are such that a plurality of the face elements 351 will engage the rod structure of the shackle frame so as to effect the gripping action effected by the belt stretches 57, 65 in the embodiment shown more particularly in FIGS. 5, 6 and 7. The chain may be driven by and returned over sprockets disposed in the positions of the pulleys 53, 55 and 61, 63. The face elements are of such length as to leave a narrow space therebetween to provide for flexing of the chain transversely of its length as it engages the shackles to accommodate to variations in the thickness and position thereof.

If desired only one of the belts 51, 59 may be replaced by the chain structure of FIGS. 10 and 11. It will be clear in such case that the desired gripping of the shackles will be secured the same as described with respect to the belts 51, 59. The backing plate 283 and its vertical flange 291 and the backing function of the hinge plates 295 may be maintained with the chain structure of FIGS. 10 and 11, the chain links 341, 343 sliding over these members the same as the belts 51, 59.

In FIGS. 2 and 14 is shown a deflector bar 355 which is used when the frames 73, 75 are pivotally moved apart to the position shown in FIG. 13 for deflecting the shackles away from engagement with the belt stretch 65 and the poultry units away from engagement with the disengaging belt stretch 133. As shown diagrammatically in FIG. 14 in which the pivoted frame member 73 is moved away from the fixed frame 75, the deflector bar 355 is supported on a vertical pivot 357 secured by suitable means in the upper frame member 105 of the frame 75. The deflector 355 comprises a transverse leg 359 which pivotally engages the pivot 357. The deflector bar 355 also is curved at its ends as shown in FIGS. 2 and 14 so that the shackles as they move toward the frames 73, 75 when these frames are in the operating position will be guided to the plane of engagement with the aligning or directing belts 31, 33 if they are displaced therefrom. In the operating position of the frames when the belt stretch 57 is disposed closely adjacent the belt stretch 65 the deflector bar 355 is moved manually to a position parallel to the stretches 57, 65 so as to be out of engagement with the shackles. When the frames 73, 75 are separated as shown in FIG. 14 the deflector bar 355 may be moved manually to the inclined position shown in FIG. 14, so that the shackles will travel therealong and move out of engagement with either of the stretches 57, 65, the poultry units also passing freely through the space between the separated frames.

In FIG. 1 are shown guards 361, 363 respectively disposed above and covering the upper frame members 97 and 105. These guards may be supported by vertical legs 365 secured as by welding to the ends of the frame members 97, 105, as shown in FIG. 1, upon which the horizontal portions of the guards rest. Each guard may have a part providing a curved vertical wall 367 disposed in clearance relation to the shackles 13 and their suspending wires 19 as they move toward and into the zone of engagement with the directing or feed belts 35, 37. These guards may be made removable and serve to prevent damage or interference in the event of a shackle being pulled out of engagement with the feed belts or the restraining belts.

As shown in FIGS. 1 and 2, the motor 175 and the speed reducer 179 driven by belt 177 may be supported on a platform 371 in the form of an inverted channel, a leg and the web of which may be welded to the leg 81 of the frame 75 and to the vertical web of bracket 91. In FIGS. 1 and 2 the pulleys 181, 187 and the belt 185 driving therebetween, FIG. 3, as well as the worm and wheel drive 191, 193 are hidden by the casing 139 for the disengaging sheave 135 and belt 131. As shown in FIGS. 1 and 2, the motor base 373 may be slidably moved on rods 375 extending between and supported in angle members 377 upstanding from the platform 371. A belt tightening device 379 which may comprise a hand wheel threaded on a screw secured to the base 373 and extending through a hole in the adjacent angle member 377 provides for adjusting the position of the base on the rods 375 to effect tightening or loosening of the belt 177, the hub of the hand wheel bearing on angle member 377.

If desired, the device 379 may be used to vary the speed of the drive by varying the pull of the belt upon an automatic variable speed pulley of conventional design mounted on the motor shaft. Increase in the tension of the belt is effected by moving the motor away from the driven pulley 183, FIG. 3, the movement of the motor toward this pulley reducing the tension. The increase in tension effects a reduction in the speed of the driven pulley 183 because the effective diameter of the automatic variable speed driving pulley becomes reduced.

On the other hand, by moving the motor toward the driven pulley the effective diameter of the automatic variable speed pulley is increased and the speed of the driven pulley 183 is increased. Other types of speed changers also may be utilized.

It will be understood that the articulated hinge plates 295 supported by the guide plates 301, 303 and biased into engagement with the belt stretch 65 by springs 309 to back up the belt stretch 65 as described, instead of being supported by the upper channel member 97 of the fixed frame 75, may be supported by the upper frame member 105 of the frame 73 which pivotally moves away from the fixed frame 75. In such case the rigid backing member 283 and its vertically disposed flange 291 may be disposed so as to back up the belt stretch 65 instead of the belt stretch 57. The springs 309 in such case would bias the belt stretch 57 to move toward the belt stretch 65 in FIG. 5.

It also may be desirable in some cases to dispose the track 1 in the dotted position of FIG. 11 offset toward the left with respect to the vertical plane of the shackle 13 so that the shackle by its weight and that of the poultry unit is biased into engagement with the stretch 31 of the belt 35 rather than the stretch 33 of the belt 37 as is shown and described with respect to the full lines in FIG. 11. In either case the shackle aligning belts 35, 37 effect the requisite alignment for engagement of the shackles with the streches 57, 65 of the restraining belts 51, 59 as the shackles come into engagement with the stretches 57, 65 and are gripped thereby by virtue of the backing structure which has been described.

Other variations may be made within the skill of the art to suit different conditions, for utilizing conveying apparatus of different types and object supporting elements and poultry shackles of different forms while maintaining the essential structures which are utilized in accordance with the invention to direct the shackles so as to produce the travel of the shackles in the proper relation to each other in a path of travel generally parallel to the conveyor and then to restrain the shackles from moving transversely of their path of travel while the object or the poultry unit is given a disengaging movement from the position of holding engagement with the shackle or supporting device, this disengaging movement being generally opposite to the direction of movement which was given to the object or poultry unit in inserting the unit in the device or shackle for support in its travel as conveyed by the conveyor. All such variations and modifications are intended to be within the scope of the appended claims.

What is claimed is:

1. In apparatus for conveying a series of separate objects the combination with a conveyor extending along and supported for travel thereof along a given path, of a plurality of object supporting elements arranged in succession along said path, means supporting said elements on said conveyor for travel thereof with said conveyor along said path, each of said elements having a rigid form and being adapted to hold an object brought into engagement therewith by movement of said object in a given direction relative to said element for supporting said object for travel thereof with said element along said path, said element being adapted for release of said object from said engagement upon movement of said object in a direction generally opposite to said given direction, said element supporting means providing for movement of said elements individually relative to said conveyor transversely of said path, means disposed adjacent said path at a given location therealong for engaging said elements in succession and restraining said elements against movement thereof transversely of said path while providing for said travel thereof along said path, and disengaging means disposed adjacent said given location and in a predetermined relation to said element restraining means so as to be engaged by said objects in succession as they travel along said path for effecting said opposite movement of said objects in succession so as to disengage said objects from said elements.

2. In apparatus for conveying a series of separate objects the combination with a conveyor extending along and supported for continuous forward travel thereof along a given horizontal path, of a plurality of object supporting elements arranged in succession along said conveyor, means supporting said elements on and for travel thereof with said conveyor along said path, each of said elements having a rigid form and being adapted to hold an object brought into engagement therewith by downward movement of said object relative thereto for supporting said object for travel thereof with said element along said path, said element being adapted for release of the object from said engagement upon generally upward movement of said object relative to said element, said element supporting means providing for movement of said elements individually relative to said conveyor transversely of said path, means disposed adjacent said path at a given location therealong for engaging said elements in succession and restraining said elements against upward movement thereof while providing for said travel thereof along said horizontal path, and disengaging means disposed adjacent said given location and in a predetermined relation to said element restraining means so as to be engaged by said objects in succession as they travel along said path for effecting upward movement of said objects in succession so as to disengage said objects from said elements.

3. In apparatus for conveying a series of separate objects the combination as defined in claim 1 which comprises means disposed adjacent said path and spaced with respect to said element restraining means in the direction opposite to the direction of travel of said conveyor for engaging said elements in succession prior to engagement thereof by said restraining means and for directing said elements to travel in succession into said engagement with said restraining means in a predetermined relation with respect to said restraining means.

4. In apparatus for conveying a series of separate objects the combination as defined in claim 3 which comprises means cooperating with said element directing means to effect travel of said elements along a predetermined length of said path toward engagement with said restraining means at a faster rate than the travel of said element along said path toward said directing means.

5. In apparatus for conveying a series of separate objects the combination as defined in claim 1 which comprises means disposed adjacent said path and spaced with respect to said element restraining means in the direction opposite to the direction of travel of said conveyor for engaging said elements in succession prior to engagement thereof by said restraining means and for confining said elements to travel in succession into said engagement with said restraining means in a predetermined orientation with respect to said path, and means cooperating with said confining means for concomitantly increasing the space along said path between said consecutive elements traveling into engagement with said restraining means.

6. In apparatus for conveying a series of separate objects the combination as defined in claim 1 in which said element restraining means comprises two belts extending along said path and respectively engaging the opposite sides of said elements, said belts being supported for movement thereof lengthwise thereof along said path and restraining said elements against said transverse movement and concomitantly for effecting said travel thereof along said path.

7. In apparatus for conveying separate objects the combination as defined in claim 6 which comprises a directing belt disposed adjacent said path and spaced with respect to said element restraining belts in the direction opposite to the direction of travel of said conveyor, said directing belt extending generally parallel to said path and supported for movement thereof in the direction of travel of said conveyor, said directing belt being disposed for engaging said elements in succession prior to engagement thereof by said element restraining belts for directing said elements to travel in succession into engagement with said restraining belts in a predetermined relation to said element restraining belts, and means for effecting said movement of said directing belt at a speed greater than the speed of said conveyor conveying said elements toward said directing belt.

8. In apparatus for conveying a series of separate objects the combination as defined in claim 1 in which said disengaging means effecting said generally opposite movement of said objects comprises a belt supported for movement of a stretch thereof in a plane generally parallel to said path of travel of said objects and in inclined relation to said path in said plane, said inclined belt being disposed so as to engage said objects in succession as said elements are being restrained by said restraining means for effecting said generally opposite movement of said objects to disengage said objects from the respective elements.

9. In apparatus for conveying a series of separate objects the combination as defined in claim 8 which comprises means cooperating with said inclined belt for deflecting said objects in succession to a given side of said inclined belt, and means concomitantly engaging said elements for deflecting said elements in succession to the opposite side of said inclined belt, whereby said inclined belt is effective to disengage said objects in succession from the respective elements.

10. In apparatus for conveying a series of separate objects the combination with a conveyor supported for travel thereof along a given path, of a plurality of object supporting elements arranged in succession along said path, means supporting said elements on said conveyor for travel thereof with said conveyor along said path, each of said elements having a rigid form and being adapted to support an object for effecting travel of said object with said element along said path, said element supporting means providing for movement of said elements individually relative to said conveyor transversely of said path, a frame structure disposed adjacent a given location along said path, a pair of belts extending along said path and supported by said frame structure for movement of said belts lengthwise thereof along said path and disposed in a given plane parallel to said path in positions for respectively engaging said elements at opposite sides thereof to prevent movement of said elements transversely of said path and transversely of said plane while providing for concomitant travel of said elements with said belts along said path, and means supported by said frame structure and operatively connected to said belts for effecting movement of said belts one relative to the other generally parallel to said plane and transversely of said path toward and away from said positions of engagement of said belts with said elements travelling along said path.

11. In apparatus for conveying a series of separate objects the combination with a conveyor supported for travel thereof along a given path, of a plurality of object supporting elements arranged in succession along said path, means supporting said elements on said conveyor for travel thereof with said conveyor along said path, each of said elements being adapted to support an object for effecting travel of said object with said element along said path, a frame structure disposed adjacent a given location along said path, said frame structure providing a stationary frame and a movable frame, said movable frame being pivotally connected to said stationary frame for pivotal movement of said movable frame toward and away from said stationary frame, a pair of belts extending along said path and supported respectively by said stationary and movable frames for movement of said belts lengthwise thereof along said path and in positions for respectively engaging said elements at opposite sides thereof for concomitant travel of said elements with said belts along said path, said belt supported by said movable frame being movable therewith transversely of said path toward and away from the belt supported by said stationary frame upon said pivotal movement of said movable frame, and means operatively connected to said frames for effecting said movement of said movable frame toward and away from said stationary frame to move said belt supported by said movable frame transversely of said path toward and away from said position thereof in engagement with said elements traveling along said path.

12. In apparatus for conveying a series of separate objects the combination as defined in claim 11 in which said path is generally horizontal, each of said frames supporting a pair of pulleys disposed on generally vertical axes spaced along said path, said belts being endless and being carried on the respective pairs of pulleys with stretches thereof between their respective spaced pulleys extending along said path and adjacent each other, and means carried by said frame structure and operatively connected to said pulleys for effecting rotation of said pulleys to effect movement of said stretches of said belts along said path.

13. In apparatus for conveying a series of separate objects the combination as defined in claim 12 in which each of said frames comprises a pair of spaced vertical legs and a horizontal frame member connecting said legs, said horizontal frame members respectively supporting said pairs of pulleys.

14. In apparatus for conveying a series of separate objects the combination as defined in claim 10 in which said frame structure comprises a pair of frames, means connecting said frames for movement of one relative to the other, said belts respectively being supported by said frames for said movement of one belt relative to the other generally parallel to said plane transversely of said given path upon said movement of said frames one relative to the other, and means connected to said frames for locking said frames against said movement thereof to maintain said belts in positions adjacent and extending along said path.

15. In apparatus for conveying a series of separate objects the combination as defined in claim 14 which comprises means operatively connected to said frames for effecting said movement of one with respect to the other and connected to said locking means for effecting said locking of said frames against said movement thereof upon movement of said frames to positions supporting said belts in said positions adjacent and extending along said path.

16. In apparatus for conveying a series of separate objects the combination with a conveyor supported for travel thereof along a given path, of a plurality of object supporting elements arranged in succession along said path, means supporting said elements on said conveyor for travel thereof with said conveyor along said path, each of said elements being adapted to support an object for effecting travel of said object with said element along said path, a stationary frame disposed adjacent a given location along said path, a movable frame pivotally connected to said stationary frame for pivotal movement of said movable frame toward and away from said stationary frame and transversely of said path, a pair of belts extending along said path and supported respectively by said stationary frame and said movable frame in positions for engaging said elements respectively at opposite sides thereof to prevent movement of said elements transversely of said path while providing for concomitant travel of said elements with said belts along said path, said belt supported by said movable frame being movable to and from said position of said belt engaging said elements concomitantly with movement of said movable frame toward said stationary frame, a main vertical shaft supported by said stationary frame, driving connections between said main vertical shaft and said belts, a motor supported by said stationary frame, and driving means connecting said motor to said main vertical shaft for driving said vertical shaft and said belts.

17. In apparatus for conveying a series of separate objects the combination as claimed in claim 16 in which said driving means connecting said motor to said main vertical shaft comprises a speed reducer for effecting rotation of said main vertical shaft at a speed reduced with respect to the speed of said motor.

18. In apparatus for conveying a series of separate objects the combination as defined in claim 16 which comprises kinematic means providing said driving connections between said main vertical shaft and said belts for effecting said movement of said belts along said path upon rotation of said main vertical shaft.

19. In apparatus for conveying a series of separate objects the combination with a conveyor supported for travel thereof along a given path, of a plurality of object supporting elements arranged in succession along said path, means supporting said elements on said conveyor for travel thereof with said conveyor along said path, each of said elements having a rigid form and being adapted to support an object for travel thereof with said object supporting element along said path, said element supporting means providing for movement of said elements individually relative to said conveyor transversely of said path, a frame structure disposed adjacent a given location along said path, a pair of elongated elements extending lengthwise thereof along said path and supported by said frame structure for movement of said elongated elements lengthwise thereof along said path and respectively in positions for engaging said object supporting elements at opposite sides thereof for restraining said elements against movement thereof transversely of said path and for concomitant travel of said object supporting elements with said elongated elements along said path, and means supported by said frame structure and operatively connected to said elongated elements for effecting movement of said elongated elements one relative to the other transversely of said path toward and away from said positions of engagement of said elongated elements with said object supporting elements traveling along said path.

20. In apparatus for conveying a series of separate objects the combination as defined in claim 1 in which said disengaging means comprises a stretch of a belt supported for movement lengthwise thereof in a path inclined to the path of travel of said objects and inclined to said given direction of movement of said object into engagement with said supporting element, said stretch being disposed so that said objects traveling in said path are brought in succession into engagement with said stretch and are moved thereby in said opposite direction concomitantly with travel along said path and so as to effect said disengagement of said objects in succession from said supporting elements.

21. In apparatus for conveying a series of separate objects the combination as defined in claim 1 in which said given path and said given direction are in the same generally vertical plane, said disengaging means comprising a sheave supported for rotation in said vertical plane on a horizontal axis, a second sheave, an endless belt extending about said two sheaves in driving relation one with respect to the other, said second sheave being disposed in relation to said first sheave so that a stretch of said belt extending between said sheaves is inclined in said vertical plane both to said given path and to said given direction, said sheaves being disposed in relation to said path of travel of said objects so that said stretch of said belt is engaged by said objects in succession as they travel along said path, and means for effecting rotation of one of said sheaves to effect movement of said stretch of said belt in a direction to develop a component of said movement of said stretch in said direction opposite to said given direction to effect disengagement of said objects engaged by said belt stretch from said supporting elements in succession.

22. In apparatus for conveying a series of separate objects the combination with a conveyor extending along and supported for travel thereof along a given path, of a plurality of object supporting elements of rigid form arranged in succession along said path, means supporting said elements on said conveyor for travel thereof with said conveyor along said path, said element supporting means providing for movement of said elements individually relative to said conveyor transversely of said path, a pair of belts extending along said path and respectively engaging the opposite sides of said elements, said belts being supported for movement thereof lengthwise thereof along said path and restraining said elements against movement thereof transversely of said path and concomitantly for effecting said travel of said elements along said path, and a directing belt disposed adjacent said path and spaced with respect to said element restraining belts in the direction opposite to the direction of travel of said conveyor, said directing belt extending generally parallel to said path and being supported for movement thereof in the direction of travel of said conveyor, said directing belt being disposed for engaging said object supporting elements in succession prior to engagement thereof by said element restraining belts for directing said elements to travel in succession into engagement with said restraining belts in a predetermined relation to said element restraining belts.

23. In apparatus for conveying a series of separate objects the combination as defined in claim 22 in which each of said two restraining belts is endless and each is supported upon two pulleys spaced along said path to provide stretches of said two belts adjacent each other and at opposite sides of said object supporting elements, said directing belt being endless and being supported on two pulleys disposed in spaced relation along said path to provide a stretch adjacent said path for engaging said object supporting elements for directing said elements to travel into said predetermined relation to said restraining belts, the forwardly disposed pulley of said directing belt being disposed in the forward direction along said path with respect to the rearwardly disposed pulleys of said restraining belts, so that said object supporting elements are engaged by said restraining belts concomitantly with release from said directing belt.

24. In apparatus for conveying a series of separate objects the combination with a conveyor extending along and supported for travel thereof along a given path, of a plurality of object supporting elements arranged in succession along said path, means supporting said elements on said conveyor for travel thereof with said conveyor along said path, each of said elements having a rigid form and being adapted to support an object for effecting travel of said object with said element along said path, said element supporting means providing for movement of said elements individually relative to said conveyor transversely of said path, two belts each having a stretch disposed adjacent and extending along said path and supported for movement of said stretches lengthwise thereof along said path in positions engaging said elements in succession respectively at opposite sides thereof for travel of said elements with said belts concomitantly with said travel of said conveyor along said path, means supporting said belts for movement thereof transversely of said path one with respect to the other, and means operatively connected to said belts for biasing said belts to move one toward the other to effect engagement of said belts with said elements to restrain said elements against movement thereof transversely of said path while providing for said travel thereof along said path.

25. In apparatus for conveying a series of separate objects the combination with a conveyor extending along and supported for travel thereof along a given path, of a plurality of object supporting elements arranged in succession along said path, means supporting said elements on said conveyor for travel thereof with said conveyor along said path, each of said elements having a rigid form and being adapted to support an object for effecting travel of said object with said element along said path, said element supporting means providing for movement of said elements individually relative to said conveyor transversely of said path, two belts each having a stretch disposed adjacent and extending along said path and supported for movement of said stretches lengthwise thereof along said path in positions engaging said elements in succession respectively at opposite sides thereof for travel of said elements with said belts concomitantly with said travel of said conveyor along said path, said belts restraining said elements against movement of said elements transversely of said path, and means for effecting movement of said stretches of said belts along said path at a speed greater than the speed of said conveyor to increase the space between consecutive elements moved into engagement with said belts.

26. In apparatus for conveying a series of separate objects the combination as defined in claim 25 which comprises a directing belt disposed adjacent said path in spaced relation to said two element restraining belts in the direction opposite to the direction of travel of said conveyor, said directing belt extending generally parallel to said path and supported for movement of a stretch thereof in the direction of travel of said conveyor, said directing belt being disposed for engaging said elements in succession prior to engagement thereof by said element restraining belts for directing said elements to travel in succession into engagement with said restraining belts in a predetermined relation to said element restraining belts, and means for effecting movement of said stretch of said directing belt at a speed greater than the speed of said conveyor and less than the speed of said restraining belts.

References Cited in the file of this patent

UNITED STATES PATENTS

| | | |
|---|---|---|
| 1,422,656 | Brennan | July 11, 1922 |
| 1,760,392 | Arminger | May 27, 1930 |
| 2,694,220 | Sharp | Nov. 16, 1954 |

FOREIGN PATENTS

| | | |
|---|---|---|
| 768,686 | Great Britain | Feb. 20, 1957 |